United States Patent [19]

Schwartz et al.

[11] Patent Number: 4,767,434
[45] Date of Patent: Aug. 30, 1988

[54] HORIZONTAL PRESS BENDING PICKUP AND DELIVERY SYSTEM

[75] Inventors: James H. Schwartz, Gibsonia; Thomas L. Waterloo, Allison Park; George R. Claassen, New Kensington, all of Pa.

[73] Assignee: PPG Industries, Inc., Pittsburgh, Pa.

[21] Appl. No.: 102,443

[22] Filed: Sep. 29, 1987

[51] Int. Cl.[4] .............................................. C03B 23/03
[52] U.S. Cl. ...................................... 65/29; 65/104; 65/106; 65/163; 65/273; 65/287
[58] Field of Search .................. 65/29, 104, 106, 107, 65/273, 163, 287

[56] References Cited

U.S. PATENT DOCUMENTS

| | | |
|---|---|---|
| 3,607,187 | 9/1971 | McMaster et al. . |
| 3,992,182 | 11/1976 | Frank .................................... 65/163 |
| 4,221,580 | 9/1980 | Frank . |
| 4,227,908 | 10/1980 | Seymour . |
| 4,229,199 | 10/1980 | Seymour . |
| 4,229,200 | 10/1980 | Seymour . |
| 4,233,049 | 11/1980 | Seymour . |
| 4,282,026 | 8/1981 | McMaster et al. . |
| 4,285,715 | 8/1981 | Frank . |
| 4,297,118 | 10/1981 | Kellar et al. . |
| 4,361,432 | 11/1982 | McMaster et al. . |
| 4,364,766 | 12/1982 | Nitschke . |
| 4,430,110 | 2/1984 | Frank et al. . |
| 4,433,993 | 2/1984 | Frank . |
| 4,437,871 | 3/1984 | McMaster et al. . |
| 4,437,872 | 3/1984 | McMaster et al. . |
| 4,475,937 | 10/1984 | Nitschke ............................... 65/163 |
| 4,517,001 | 5/1985 | McMaster . |
| 4,615,724 | 10/1986 | Fackelman ........................ 65/106 X |
| 4,662,925 | 5/1987 | Thimons et al. . |
| 4,666,492 | 5/1987 | Thimons et al. . |
| 4,666,493 | 5/1987 | Frank et al. . |
| 4,666,496 | 5/1987 | Fecik et al. . |
| 4,711,653 | 12/1987 | Frank et al. ...................... 65/104 X |

Primary Examiner—Arthur Kellogg
Attorney, Agent, or Firm—Andrew C. Siminerio

[57] ABSTRACT

A travelling vacuum pickup is used to transfer heat softened glass sheets from a heating furnace to between a pair of vertically alignment pressing molds. The downstream movement of the pickup is synchronized with the downstream movement of the glass sheets to be engaged so that there is no relative downstream movement therebetween as the pickup lifts and engages the glass sheet.

18 Claims, 4 Drawing Sheets

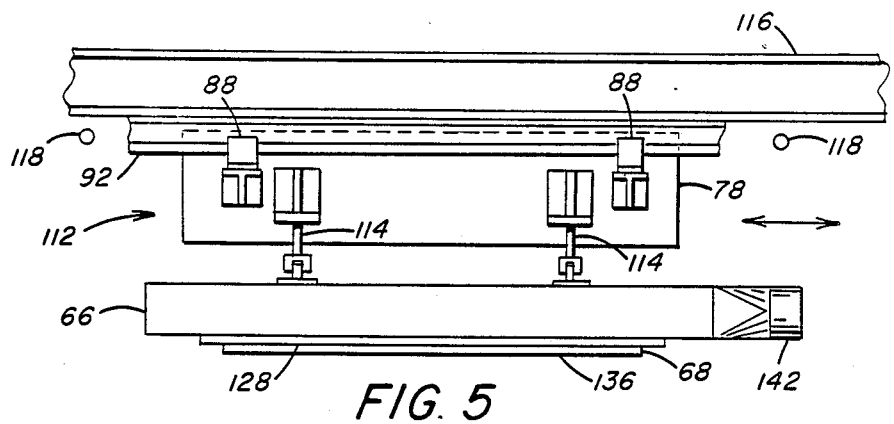
FIG. 5
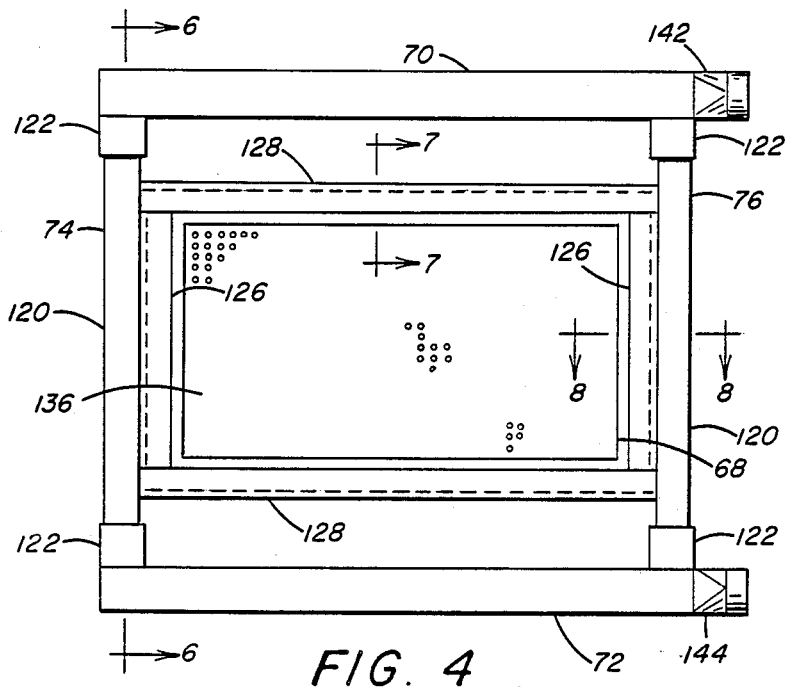
FIG. 4
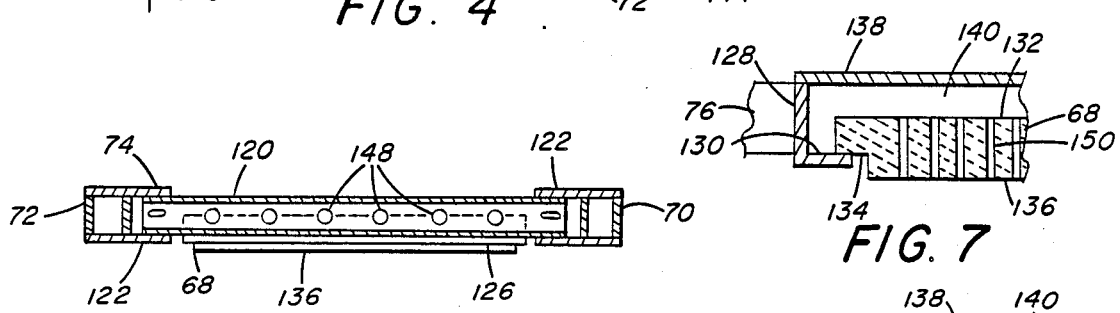
FIG. 6
FIG. 7
FIG. 8

HORIZONTAL PRESS BENDING PICKUP AND DELIVERY SYSTEM

BACKGROUND OF THE INVENTION

1. Field of the Invention

This invention relates to the bending of glass sheets, and in particular, to a pickup and shuttle system to transfer hot glass sheets directly from within a furnace to a shaping station with minimal conveyor roll marking.

2A. Technical Consideration

Shaped and tempered glass sheets are widely used as side or rear windows in vehicles, such as automobiles and the like. To be suitable for such applications, flat glass sheets must be shaped to precisely defined curvatures dictated by the shape and outline of the frames defining the window opening. It is also important that the windows meet strident optical requirements and that the windows be free of optical defects that would tend to interfere with the clear viewing therathrough.

During fabrication, glass sheets intended for use as shaped windows in vehicle are subject to thermal treatment, to temper the glass for strengthening and increase the resistance of the shaped window to damage resulting from impact. In addition to increasing the resistance of the glass sheets to breakage, tempering also causes the glass sheet to fracture in relatively small, smooth surfaced fragments that are less injurious than the relatively large jagged fragments that result from the breakage of untempered glass.

The commercial production of shaped glass sheets for such purposes commonly includes conveying a flat glass sheet along a substantially horizontal path that extends through a tunnel-type furnace to heat the sheet to its heat softening temperature, shaping the heated glass to a desired curvature, and cooling the bent sheets in a controlled manner to a temperature below the annealing range of the glass. In prior art apparatuses, the glass sheet is lifted off a conveying surface either by bottom segmented press surfaces situated between conveying rolls, by vertically reciprocating lifting fingers, by suction from a vacuum drawing arrangement, for example, an upper mold or a vacuum pickup, or some combination of these. The glass sheet is then either pressed directly against the complementing upper mold surface, dropped onto a forming ring to shape the sheet by gravity, or transferred to a shaping station where it is deposited between mold surfaces and pressed to shape.

In these arrangements, a common problem is the marking of the heat softened glass sheet due to the glass sheet slowing or stopping on the conveying rolls prior to it being lifted off the conveying rolls so as to ensure proper alignment between the glass and the lower mold or lifting ring or vacuum pickup. The resulting optical defects which may occur are commonly referred to as roll burn, which affects those portions of the glass sheet that are in extended contact with the hot conveying rolls, and roll ripple, wherein those portions between adjacent conveying rolls begin to sag prior to the shaping operation. In addition, if the glass sheet is engaged while still moving downstream, scuffing of the glass sheet surface may occur due to the engagement of the moving glass sheet with a stationery lifting and/or forming apparatus.

It would be advantageous to develop a system whereby heat softened glass sheets may be transferred directly from the furnace to a shaping station without stopping the glass sheet so as to reduce marking.

2B. Patents of Interest

U.S. Pat. Nos. 4,282,026; 4,361,432; 4,437,871; and 4,437,872 to McMaster et al. and 4,227,908; 4,229,199; 4,229,200; 4,233,049; and 4,280,828 to Seymour each teach a drop forming apparatus wherein a hot glass sheet is engaged by stationary upper vacuum pickup positioned above the conveying means and subsequently deposited onto a contoured shaping ring. The force generated by the impact of the glass sheet on the ring provides the bending force required to shape the sheet and conform it to the contours of the ring. The pickup may reciprocate vertically to engage the glass sheet or auxiliary lifters may be positioned between conveying rolls and beneath the hot glass sheet to lift the glass sheet for engagement with a vacuum pickup. Auxiliary shapers may be used to impart additional contours in the glass sheet. The ring subsequently shuttles from its pickup transfer station to a quench unit that rapidly cools the shaped glass. Throughout the operation, the vacuum pickup remains horizontally stationary within the furnace and the glass is transferred directly to a ring mold.

U.S. Pat. No. 3,607,187 to McMaster teaches a sheet shaping method and apparatus wherein flat glass sheets are removed from a conveyor by an upper vacuum mold. The mold draws the glass sheet thereagainst to shape it. The mold thereafter moves down stream to a cooling station where it deposit the sheet on a conveyor for movement through the cooling station.

U.S. Pat. Nos. 4,221,580; 4,285,715; and 4,433,993 to Frank and 4,430,110 to Frank et al. teach a horizontal press bending operation wherein heated glass sheets enter a shaping station and are lifted off the run-in conveyor rolls by a slotted lower mold. The glass sheet is pressed between the slotted lower mold and a shaped upper vacuum mold. After pressing, the lower mold is retracted to a position beneath the run-in rolls. A shuttling tempering ring is positioned below the vacuum mold and the vacuum is released so that the shaped glass sheet is deposited onto the tempering ring. The ring subsequently transfers the shaped glass sheet to a quenching station for tempering. The upper vacuum mold can reciprocate vertically but is horizontally stationary.

U.S. Pat. No. 4,297,118 to Kellar et al. teaches a shuttling, deformable vacuum mold that engages a heated glass sheet within a heating furnace. While still in the furnace, the mold deposits the shaped glass sheet on a shuttling tempering ring that is positioned beneath the mold. After depositing the glass sheet, the vacuum mold moves to a position outside of the furnace to cool prior to reentering the furnace to engage the next glass sheet. A tempering ring transfers the glass sheet from the furnace to a quenching station to temper the glass.

U.S. Pat. No. 4,517,001 to McMaster teaches the use of a travelling vacuum holder with a downwardly facing engaging surface to lift a heated glass sheet and transfer the glass sheet onto a carrier ring mold which moves into the heating furnace. The heated glass sheet is bent under the force of gravity on the mold as it is dropped thereon. The movement of the holder may be coordinated with the movement of the glass sheet so that there is no relative movement between the holder and glass sheet as the glass sheet is received by the holder. The bent glass sheet is subsequently removed from the furnace to a quench unit to temper the bent glass sheet.

U.S. Pat. No. 4,364,766 to Nitschke teaches a control system for monitoring and controlling pairs of hot glass sheets as they are conveyed through a heating, bending and tempering operation. The glass is conveyed through a heating furnace. As the glass pairs approach an overhead vacuum pickup in the furnace, a photoelectric sensor provides a glass sensing signal to a host computer that controls the rotational velocity of different sets of furnace conveyor rolls. By controlling the roll speeds, the distance between adjacent sheets of glass pairs can be established for engagement with the vacuum pickup.

U.S. Pat. Nos. 4,666,492 and 4,662,925 to Thimons et al. U.S. Pat. Nos. 4,666,493 to Frank et al. and 4,666,496 to Fecik et al. teach a horizontal press bending arrangement wherein heat softened glass sheets are engaged by a vacuum pickup within a heating furnace and transferred betwaen a pair of vertically aligned horizontally stationary upper and lower pressing molds. The glass sheet may be deposited onto an alignment device which positions the glass sheet between the upper and lower molds prior to the upper and lower molds sandwiching the glass sheet therebetween to shape it.

SUMMARY OF THE INVENTION

An object of the invention is to provide an apparatus for shaping heat softened glass sheets while minimizing marking of the sheets as they are transferred from a heating furnace to a shaping station having horizontally stationary, vertically aligned upper and lower shaping molds. The heat softened sheets are conveyed through a furnace and engaged by a vacuum pickup that is moving along with the glass sheet during engagement therewith. The movement of the glass sheet and pickup are synchronized such that there is no relative horizontal movement therebetween as the pickup engages the sheet. The pickup includes a vertically reciprocating support frame that moves the pickup from a first non engaging position to a second, sheet engaging position. In one particular embodiment of the invention, the frame is slidably supported from rail members extending downstream along the furnace to the shaping station. The glass sheet engaging surface of the pickup may be deformable and/or have a contoured configuration to impart a preliminary shape in the glass sheet prior to final shaping.

Another object of the invention is to provide a method of shaping heat softened glass sheets. The sheets are conveyed through a furnace and heated to their heat softening temperature. A vacuum pickup is positioned within the furnace such that a sheet engaging surface of the pickup is in facing relation to an upper major surface of the sheet as it is conveyed therethrough. The vacuum pickup engages tha sheet and draws a vacuum through its downwardly facing surface to hold the sheet thereagainst. The movement of the pickup is synchronized with the movement of the sheet through the furnace such that there is no relative horizontal movement between the pickup and the sheet during engagement therebetween. The sheet and pickup are then transferred to a shaping station where the vacuum is released, depositing the sheet between a pair of horizontally stationary, vertically aligned upper and lower shaping molds of a shaping station. The molds then press the sheet therebetween to shape the sheet. In one particular embodiment of the invention, the vacuum pickup reciprocate from a lowered position wherein its downwardly facing surface in close proximity to the upper major surface of the sheet as the pickup engages the sheet to a raised position.

The upper or lower shaping mold may be a vacuum mold which maintains engagement with the shaped sheet after pressing. The shaped sheet is then transferred to a tempering ring, and into a cooling station where it is cooled.

BRIEF DESCRIPTION OF THE DRAWINGS

FIG. 4 is bottom view along line 4—4 of FIG. 2 illustrating the pickup frame.

FIG. 5 is a schematic of an alternate embodiment for vertically reciprocating the pickup.

FIG. 6 is a sectional view through line 6—6 of FIG. 4 illustrating the expansion/contraction compensating pickup support, with portions omitted for clarity.

FIG. 7 is a sectional view through line 7—7 of FIG. 4 illustrating the pickup and support frame, with portions omitted for clarity.

FIG. 8 is a sectional view through line 8—8 of FIG. 4 illustrating the pickup and support frame, with portions omitted for clarity.

DETAILED DESCRIPTION OF THE INVENTION

Figure 1:
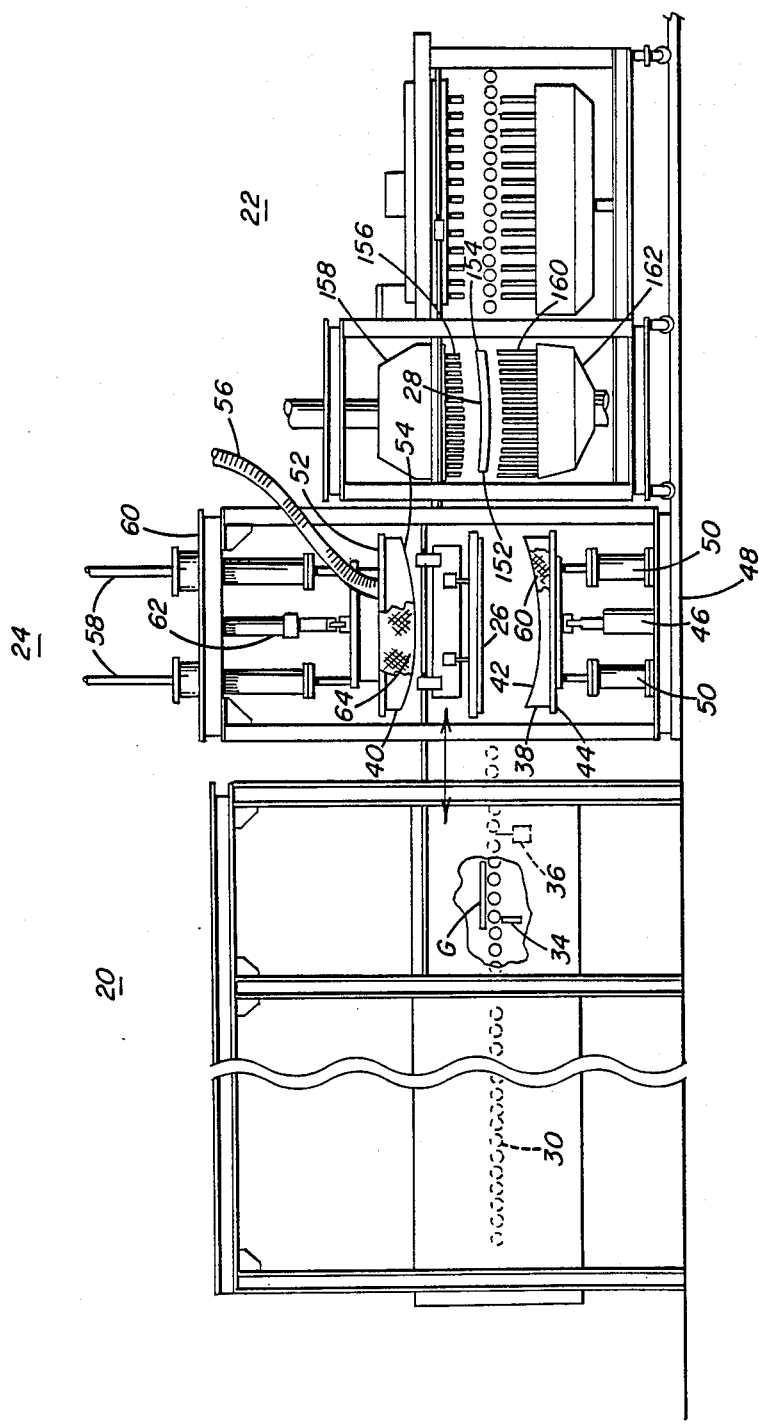
FIG. 1 is a side elevation of a glass sheet heating, shaping, and tempering apparatus incorporating the present invention.
Figure 2:
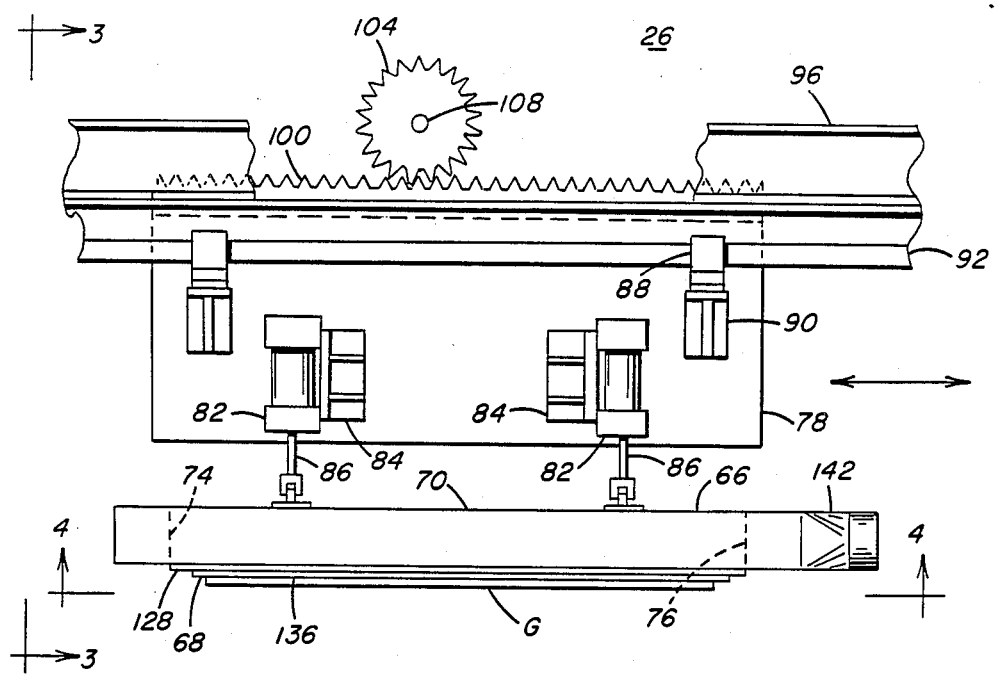
FIG. 2 is an enlarge side view of the vacuum platen pickup and transfer arrangement of the present invention.

Referring to FIGS. 1 and 2, an apparatus for heating and shaping sheets of material such as glass includes a furnace 20, through which sheets of glass are conveyed while being heated to the glass sheet deformation temperature. It should be appreciated that although in the preferred embodiment, the sheet material is glass, the invention is not limited to glass and may be used with other heat softenable sheet materials. A cooling station 22 for cooling curved sheets of glass and unloading station (not shown) located beyond the cooling station 22 are positioned to the right of the furnace 20 as shown in FIG. 1. A shaping station 24 is deposed between the furnace 20 and cooling station 22. If required the shaping station 24 may be enclosed and heated. A glass sheet transfer assembly 26 transfers heated glass sheets from the furnace 20 to the shaping station 24. A sheet transfer means 28 located in the cooling station 22, transfers the shaped glass sheets from the shaping station 24 to the cooling station 22.

Heat may be supplied to the furnace 20 in any convenient matter, for example, from gas burners or by electrical radiant heaters or by a combination of both, which heat supply means is well known in the art. The furnace 20 includes a horizontal conveyor comprising longitudinally spaced transversely extending conveyor rolls 30 that define a path of travel which extends through the furnace 20. The conveyor rolls 30 may be arranged in sections so that the speed of the different conveyor sections may be controlled and synchronized by a roll drive 32 (schematically shown only in FIG. 9) in a manner well known in the art, for proper movement and positioning of the glass sheets through the furnace 20. A glass sensing element 34 is located within the furnace 20 as shown in FIG. 1 to initiate a cycle of operation for bending as will be discussed later. A roll resolver 36 is coupled to one of the rolls 30 to monitor its rotation as will be discussed later.

Shaping station 24 includes a lower mold 38 and an upper mold 40 as shown in FIG. 1 and may be enclosed in a heated cavity (not shown), if required. The lower mold 38 is a full surface mold with an upper pressing face 42 conforming to the shape desired for the glass sheet to be bent. The lower mold 38 is fixed to a lower mold platform 44 operatively connected to piston 46 for vertically reciprocating movement. The platform 44 is connected to a lower frame 48 as shown in FIG. 1 through lower vertical guide rods 50. The upper surface 42 of the lower mold 38 is preferably smoothly surfaced to avoid imparting any irregularities in the glass sheet surface and although not limiting in this invention is preferably composed of steel, meehanite, or a ceramic composite. These materials provide a smoothly surfaced contour and good durability despite intermittent contact with hot glass that causes rapid cyclic temperature variations over an extended period.

Although not limiting in the present invention, the upper mold 40 may be a vacuum mold with an upper mounting plate 52 and an apertured lower press face 54 which complements upper pressing face 42 of lower mold 38. The upper vacuum mold 40 includes a vacuum chamber (not shown) which communicates through an evaluation pipe 54 with a vacuum source (not shown). Referring to FIG. 1, the upper vacuum mold 40 is suitably connected through upper vertical guide rods 58 to an upper supporting frame 60 and is movable relative thereto by an upper vertical piston 62. The evacuation pipe 56 may be connected through a suitable valve arrangement to a source of pressurized air (not shown) and the valve for the vacuum and pressure line may be synchronized according to a predetermined time cycle in a manner well known in the art. The upper mold 40 is preferably composed of steel, meehanite or a ceramic composite. Both the lower and upper molds 38 and 40 may be covered with a refractory material 64, such as fiber glass cloth, as is well known in the art.

Figure 3:
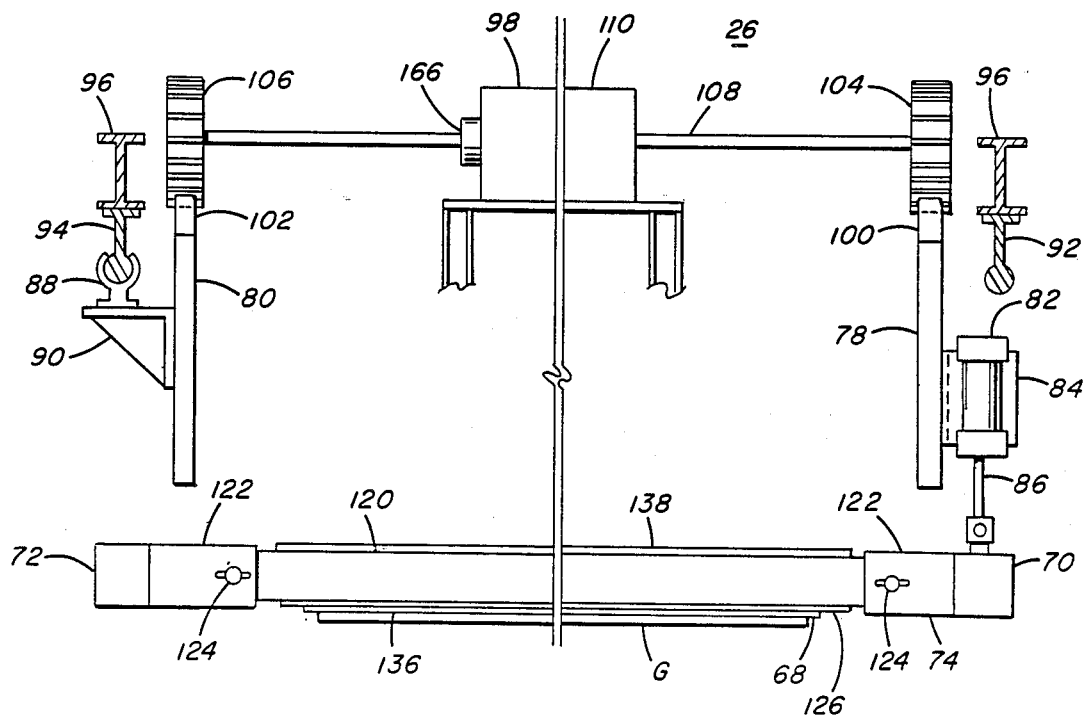
FIG. 3 is an end view of the vacuum pickup with the left hand portion illustrating the hydraulic lifting arrangement and the right side illustrating the rail support arrangement, with portions omitted for clarity.

Referring now to FIGS. 2, 3 and 4, in order to transfer heat softened sheet material from the exit end of the furnace 20 to the shaping station 24, the present invention uses the glass sheet transfer assembly 26 which includes a shuttle frame 66 to move a vacuum platen pickup 68 from a pickup position within the exit end of the furnace 20 to an unload position between the lower mold 38 and upper vacuum mold 40 of the shaping station 24.

The shuttle frame 66 supports pickup 68 and includes a pair of longitudinally extending support beams 70 and 72 interconnected by cross member 74 and 76. The beams 70 and 72 and members 74 and 76 are hollow to supply vacuum to the pickup 68 as will be discussed later. The shuttle frame 66 is adjustably supported from plate supports 78 and 80 for vertically reciprocating movement. In the particular embodiment illustrated in FIGS. 2 and 3, lifting cylinders 82, for example, hydraulic cylinders, are mounted to plates 78 and 80 by angle mounts 84. The head end of the piston rod 86 of each cylinder 82 is secured to either beam 70 or 72. The simultaneous extension or retraction of piston rods 86 will reciprocate frame 66 and pickup 68 supported thereon in a vertical direction. Plates 78 and 80 include rail collars 88 secured to supports 90 slidably capture rail members 92 and 94 mounted on mainframe 96. Rails 92 and 94 extend in a downstream direction i.e., along the direction in which the glass sheets are conveyed through furnace 20 and into shaping station 24. The frame 66 is moved along rails 92 and 94 via a drive arrangement 98 which includes gear racks 100 and 102 fixed to the top edge of the plates 78 and 80, respectively, which are engaged by drive sprockets 104 and 106, respectively. Sprockets 104 and 106 are mounted on a common drive shaft 108 which is driven by motor 110. Although not limiting in the present invention, the motor 110 is preferable an A. C. servomotor with reducer.

FIG. 5 schematically illustrates as alternate arrangement for providing vertical movement to pickup 68. In particular, rail and pickup assembly 112 includes frame 66 supported from plates 78 and 80 (plate 80 not shown in FIG. 5) by connectors 114. Rail mounting beam 116 is positioned on rotating cams 118 which, when rotated, lift the entire rail and pickup assembly 112. For example, by rotating cams 118 clockwise as shown in FIG. 5, the rail mounting beam 116 will move upward. Since the pickup 68 is indirectly supported by the beam 116 through frame 66, connectors 114, plates 78 and 80, rail collars 88, and rails 92 and 94 (rail 94 not shown in FIG. 5), the pickup 68 will also move upward. As cams 118 rotates counterclockwise, the pickup 68 will be lowered. It should be noted that in this embodiment, the drive arrangement (not shown) may be similar to that discussed, supra, but with the additional requirement that it must be mounted to vertically reciprocate with the rail and pickup assembly 118 or at least be capable of maintaining driving engagement therewith during movement of the frame 66.

Because the shuttle frame 66 is exposed to high thermal conditions and thermal cycling i.e., movement from its park position in the furnace 20 to the unload position in the shaping station 24 and back again, it is subject to conditions that may tend to warp and bend the frame 66. The arrangement of the preferred shuttle frame 66 overcomes this by providing free expansion capabilities. Referring to FIGS. 3 and 4, cross members 74 and 76 include center supports 120 that is slidably received by collar members 122 secured to support beams 70 and 72. Pins 124 are inserted through aligned slotted openings in collar members 122 and center supports 120. The pins 124 secure the center supports 120 and the vacuum pickup 68 supported thereon in place, as will be discussed later, while the slotted openings allow the center supports 120 to expand and contract due to thermal cycling without warping frame 66. The pinned connections of the cylinder piston rods 86 to beams 70 and 72 provide sufficient play for any longitudinal expansion of the frame 66.

Referring to FIGS. 4, 7 and 8, angle members 126 are secured along center supports 120 and angle members 128 extend between center supports 120 to provide a ledge support 130 for the vacuum pickup 68. The pickup 68 includes a flat lower apertured wall 132 and an outer perimeter ledge 134 which is seated on ledge support 130 so that the pickup 68 is supported about its perimeter. Although not limited in the present invention, the lower wall 132 of pickup 68 is preferably made of either ceramic material or meehanite. In either instance, the lower face 136 of the wall 132 may be covered with a heat resistant non-reactive insulating smooth surface material (not shown) to help insulate the glass sheet G from the pickup 68 in order to reduce heat loss and permit a lower exit temperature of the glass sheet G from the furnace 20.

As an alternative, the engaging surface of the pickup 68 may be shaped so as to impart an initial configuration to the glass sheet. In addition, the pickup 68 may be a deformable pickup such that it may engage the glass sheet in a flat configuration and subsequently deform to impart an initial shape in said glass sheet.

In the particular embodiment of the invention illustrated at FIGS. 7 and 8, the top edge of angle member 128 is generally level with the top surface of center support 120. Lid 138 is supported by center supports 120 and angle members 128 and along with the lower wall 132 forms a vacuum chamber 140. Vacuum is supplied to the pickup 68 through the support frame 66. Vacuum hookups 142 and 144 as shown in FIGS. 2 and 4 are connected to support beams 70 and 72. As discussed, supra, a continuous passage connects support beams 70 and 72 with cross members 74 and 76. Referring to FIG. 8, inner walls 146 of the support 120 of members 74 and 76 have openings 148 that provide access from the continuous passageway into vacuum chamber 140. Passages 150 extend from face 136 through lower wall 132 to vacuum chamber 140 so that vacuum may be drawn along the face 136 of wall 132 through passages 150, chamber 140, supports 120 and support beams 70 and 72 from vacuum hookups 142 and 144. This arrangement of directing the vacuum through the shuttle frame 66 allows, if desired, the vacuum hookups 142 and 144 to be connected outside of the furnace 20 so that they are not exposed to high temperature conditions or thermal cycling. Furthermore, any thermal degradation of the vacuum actuators or valves is reduced.

The use of multiple lifting cylinders 82 provides a variety of different motions and orientation of the pickup 68. The cylinders 82 support the pickup 68 in a horizontal position and simultaneously raise and lower the pickup 68 while maintaining the pickup face 136 in a generally horizontal orientation. The cylinders 82 also allow the pickup 68 to be tilted left to right, front to back or any combination thereof. In addition, if required, the pickup 68 may be moved subsequently i.e., first moving the front portion and then the rear portion.

Referring to FIG. 1, the sheet transfer means 28 at the cooling station 22 includes a ring member 152 similar to that in U.S. Pat. No. 4,285,715 which teachings are hereby incorporated by reference. The ring member 152 includes a support rail 154 that is disposed edgewise with its edge forming the supporting surface of the member 152. The rail 154 follows the contours of the shaped glass sheet and is spaced slightly inboard of the glass sheet perimeter. The glass sheet supporting surface of the rail 154 is preferable a nonmetallic material that can support the hot glass sheet without leaving a mark on the glass sheet surface. The ring member 152 is mounted on a carriage (not shown) which moves the member 152 from an upstream position wherein the member 152 is positioned in the shaping station 24 beneath the upper vacuum mold 40, to a downstream position wherein the member 152 is positioned between quenching nozzles in the cooling station 22.

The cooling station 22 which is similar to that taught in U.S. Pat. No. 4,285,715 includes longitudinally spaced, transversely extending rows of spaced nozzles 156 extending downward from an upper platen 158 as shown in FIG. 1. In an opposing position to nozzles 156 are longitudinally spaced transversely extending rows of nozzles 160 on lower platen 162. The nozzles 160 are spaced vertically below the upper pipe nozzles 156 to provide clearance for moving the ring member 152 along a path therethrough. The lower ends of the rows of the nozzles 156 are located along a curved surface complementing the curved shape of the upper ends of the rows of nozzles 160 and vertically spaced thereabove to provide a curved clearance space conforming to the transverse shape of the glass sheet conveyed therebetween.

Figure 9:
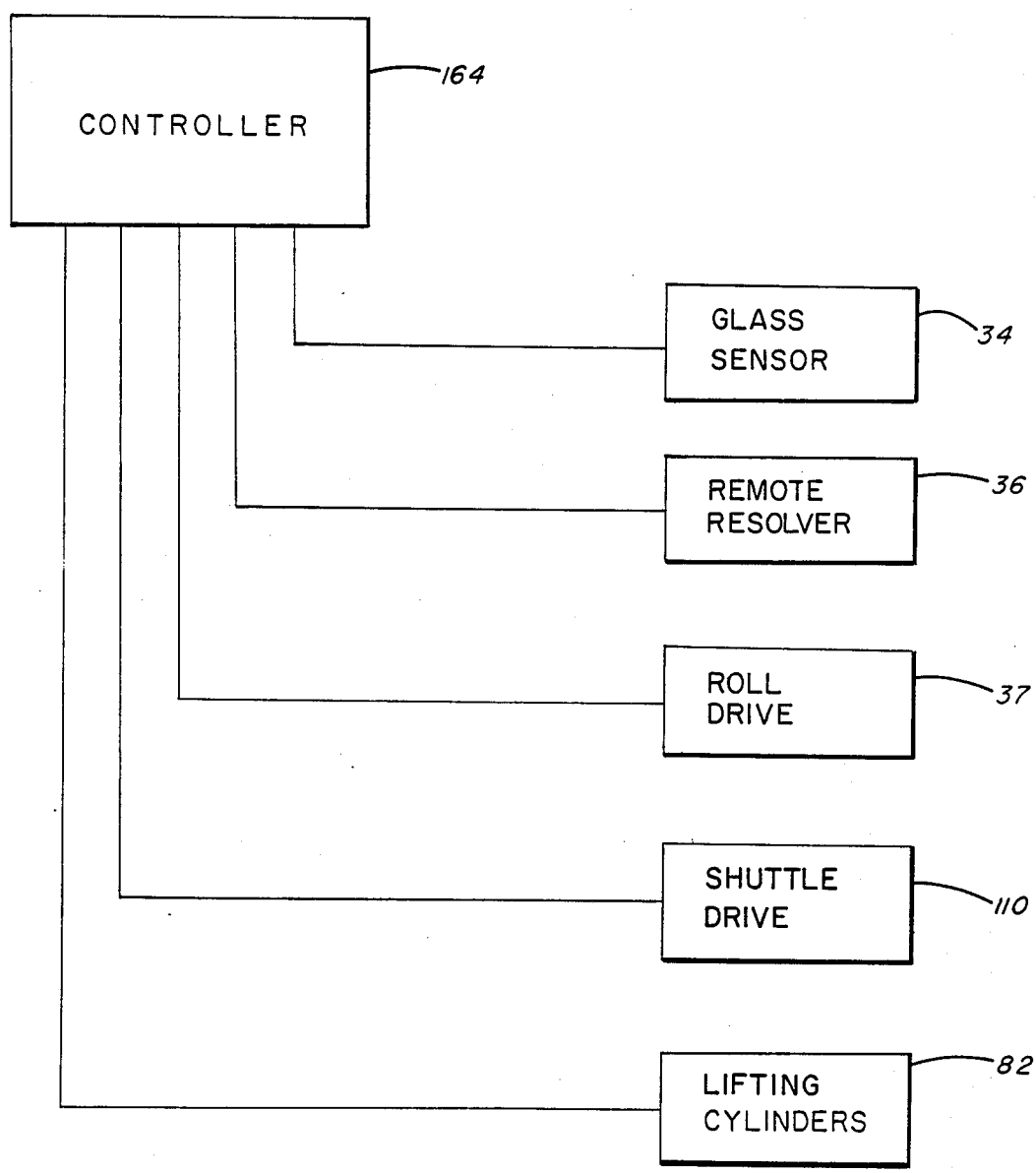
FIG. 9 is a block diagram illustrating one type of control system that may be used with the present invention.

Referring to FIG. 9, a controller 164 initiates set sequences in response to the sensor 34 and resolver 36 and establishes the acceleration, deceleration and positioning of the shuttle frame 66 as the pickup 68 engages the glass sheet and moves from the furnace 20 to the shaping station 24 and back again. In operation, a glass sheet G is conveyed through the furnace 20 over the conveying rolls 30 and heated to its heat softened temperature as shown in FIG. 1. In the preferable embodiment, the glass sheet G is heated to approximately 1200° F. (649° C.) depending on the difficulty of the bend. The glass sheet G activates the sensing element 34 and initiates the shaping sequence. In the particular embodiment illustrated in FIG. 1, the leading edge of the glass G sheet is detected by sensor 34. The sensor 34 may be a light source such as a laser or a heat detector such as a infrared thermometer. The glass position is monitored according to the rotational position of the rolls. The roll position is sensed by the resolver 36 which is mechanically coupled to one of the conveying rolls 30 so that, for example, one roll revolution equals one resolver revolution. The controller 164 counts the number of revolutions of the resolver 36 to determine the glass sheet position. As an alternative, the roll position can be monitored by paralleling the resolver on the roll drive motor 32. Paralleling the roll drive 32 involves monitoring the revolution of the drive shaft, taking into account any corrections due to gear reduction. In one particular embodiment of the invention, the glass sheet position is monitored by the controller 164 (not shown in FIG. 1) in 0.0001 inch (0.00254 millimetar) units. The monitoring establishes the linear position of the glass sheet G in the conveying direction. The glass sheet G is conveyed beneath the vacuum pickup 68 on the shuttle frame 66 which is in its parked and raised position at the exit end of the furnace 20 with its lower aperatured wall 132 approximately ½ inch to ¾ of an inch (1.27 cm to 1.91 cm) above the upper surface of the glass sheet G.

The controller 164, in response to the sensor 34, opens a vacuum valve (not shown) so that vacuum is drawn through the pickup 68 and to ensure that the desired vacuum is at full operating levels prior to engagement of the glass sheet G by the pickup 68. The controller 164 sets the roll resolver 36 position to zero when the edge of the glass sheet G is detected. Because of a predetermined, fixed spacing between the glass sensor 34 and the pickup shuttle frame 66 while at its parked position in the furnace, the controller 164 can determine when the glass sheet G is fully under the pickup 68. Once the glass sheet G has reached this position, the controller 164 synchronizes the pickup shuttle drive motor 110 with the roll resolver 36 thus tracking the glass sheet G with the pickup 68. If desired, a resolver 166 may be coupled to shaft 108 of drive assembly 98 as shown in FIG. 3 in order to monitor the rotation of shaft 108 and the movement of frame 66 and pickup 68 via sprockets 104 and 106 and gear racks 100 and 102. The lifting cylinders 82 are thereafter activated to move support frame 66 and pickup 68 to a lowered position which is preferably a minimum of 3/32 inches (0.24 cm) above the upper surface of the glass sheet G. The initial vacuum level is set at a level that will not lift the glass sheet G when the pickup 68 is in a raised position but will lift the glass sheet G when the pickup 68 is a lowered position while the pickup 68 is tracking the glass sheet G. Depending on the configuration and thickness of the glass sheet G, the required vacuum level varies from approximately ½ inches to 2 inches (1.27 cm to 5.08 cm) of water. The glass sheet G is lifted by suction into contact with the pickup 68. The lifting action of the pickup 68 is almost instantaneous. Since the pickup 68 is moving downstream at the same speed as the glass sheet G such that there is no relative longitudinal movement therebetween, no one portion of the glass sheet G will be in extended contact with a hot conveying roll, thus eliminating defects such as roll burn and roll ripple on the glass which may occur if the glass sheet is stopped or greatly slowed to affect accurate positioning relative to the pickup 68.

If required, a high speed conveyor roll section (not shown) which includes a creep or slow speed conveying mode controlled by a timer, may be positioned immediately upstream from the shaping station 24. These rolls are activated by controller 164 in response to sensor 34 to accelerate the glass sheet and increase the spacing between adjacent glass sheets and decelerate the glass sheet G prior to its engagement with the vacuum pickup 68 so as to provide more accurate positioning.

After the glass sheet G is lifted and engaged by the traveling Pickup 68, the shuttle frame 66 continues into the shaping station 28. As the shuttle frame 66 moves out of the furnace 20 towards the unload position at the shaping station 24, the lifting cylinders 82 are actuated and lift the frame 66, pickup 68 and glass sheet G as they exit the furnace 20 to provide additional clearance between the glass sheet G and the conveying rolls 30. If required, the vacuum in the pickup 68 may be reduced during shuttling to the minimum level required to hold the glass sheet G. This throttling back of the vacuum helps eliminate any marking to the glass surface that may result from excessive vacuum suction.

As the pickup 68 approaches the shaping station 24, the controller 164 initiates a deceleration sequence to slow and stop the pickup 68 with the glass sheet G adhered thereto in a predetermined position between the lower mold 38 and upper mold 40. After a preset timing delay, the vacuum in pickup 68 is released and the glass sheet G is deposited on the lower mold 38. After a short delay to assure that the glass sheet G has dropped, shuttle frame 66 reverses direction and travels back into the furnace 20 to its parked position. If desired, prior to release of the glass sheet G, the cylinders 82 may lower the pickup 68 so as to reduce the drop of the glass sheet onto the lower mold 38.

It should be appreciated by those skilled in the art that the glass sheet lifting operation via pickup 68 may not require the vertical movement imparted to the pickup 68 by lifting cylinders 82. If desired, the pickup 68 may remain vertically stationery. With such an arrangement, the vacuum level in the pickup 68 must be sufficient to retrieve the glass sheet directly from the furnace conveyor rolls 30

Molds 38 and 40 move vertically relative to each other to press the glass sheet G therebetween. During pressing, vacuum is drawn through the vacuum chamber of the upper vacuum mold 40 to hold the shaped glass sheet against the apertured lower wall 54 so that the glass sheet G will remain in contact with the lower wall 54 when the lower mold 38 is retracted. After a mold press timer controlling the amount of time the molds 38 and 40 press the glass sheet G times out, the molds retract with vacuum still being drawn to hold the glass sheet G against the upper mold 40. After a preset time delay, the ring member 152 moves upstream from the cooling station 22 and is positioned beneath the upper vacuum mold 40. When the member 152 is in position, the vacuum of the upper mold 40 is released permitting the shaped glass sheet G to be deposited onto the member 152.

The glass sheet G is transferred downstream to the cooling station 22 where it is quenched to impart at least a partial temper in the shaped glass sheet. The glass sheet is then transferred to a cooling conveyor (not shown) for further cooling.

It should be appreciated that although the pickup 68 as discussed, supra, is illustrated in conjunction with an upper vacuum mold, it may also be used in a press bending operation that incorporates a lower vacuum press as taught in allowed patent application U.S. Ser. No. 947,254 to Frank, which teachings are herein incorporated by reference.

The heating and shaping apparatus of the present invention provides a method for transferring glass sheets from a furnace 20 to a shaping station 24 with horizontally stationary full face upper and lower shaping molds with no relative movement between the glass sheet G to be shaped and the vacuum pickup 68 so as to reduce the possibility of glass marking during transfer. The molds 38 and 40 provide a full surface contact between the glass sheet G and the shaping surfaces to enable the complex shaping of heat softened glass sheets that is not possible while using drop forming or segmented lower lifting molds techniques.

The form of the invention shown and described in this disclosure represents an illustrative preferred embodiment thereof. It is understood that the invention as defined in the claimed subject matter which follows and that various modifications thereof which becomes obvious in light of a reading of the description are incorporated therein.

We claim:

1. An apparatus for shaping heat softened sheet material comprising:
   means to heat said sheet to be shaped to its heat softening temperature;
   a shaping qtation having horizontally stationary, vertically aligned upper and lower shaping molds;
   means to convey said sheet through at least a portion of said heating means;
   a vacuum pickup with a downwardly facing sheet engaging surface to engage an upper major surface of said sheet within said heating means;
   means to move said pickup with said sheet engaged thereagainst to said shaping station and between said upper and lower shaping molds; and
   means to synchronize movement of said pickup relative to said sheet such that there is no relative horizontal movement between said pickup and said conveyed sheet as said pickup engages said sheet.

2. The apparatus as in claim 1 wherein said synchronizing means includes glass sensing means to establish the position of said sheet as it is conveyed through said heating means and control means to initiate synchronized movement of said pickup with said sheet.

3. The apparatus as in claim 2 wherein said moving means includes a shuttle frame with said vacuum pickup being supported therefrom, and further including means to vertically reciprocate said vacuum pickup such that when said pickup is in a first vertical position, said engaging surface is in a first position relative to said upper major surface of said sheet on said conveying means and when said pickup is in a second position said engaging surfaces in second position relative to said sheet.

4. The apparatus as in claim 3 wherein said reciprocating means includes a plurality of lifting members positioned on said shuttle frame.

5. The apparatus as in claim 4 wherein each lifting member is individually controlled such that the vertical movement of said pickup at each of said lifting members may vary relative to any other lifting member.

6. The apparatus as in claim 3 wherein said moving means includes rail members extending generally in the direction in which said glass sheet is conveyed and rail collars mounted on said frame and slidably secured to said rail such that said frame slides along said rail and further wherein said reciprocating means includes means to vertically displace said rail members.

7. The apparatus as in claim 3 wherein said downwardly facing engaging surface of said vacuum pickup is deformable.

8. The apparatus in claim 3 wherein said downwardly facing engaging surface of said pickup is contoured so as to preliminarily shape said sheet upon contact therewith.

9. The apparatus as in claim 3 wherein said upper shaping mold is a vacuum mold and further including a cooling station downstream from said shaping station and means to transfer said shaped sheet from said shaping station to said cooling station wherein said transfer means includes a tempering ring movable from said cooling station to between said molds at said shaping station and beneath said shaped sheet when said molds are in a separated position.

10. The apparatus as in claim 1 wherein said sheet is a glass sheet.

11. A method of shaping heat softened sheet material comprising:
conveying said sheet through a heated cavity;
heating said sheet to its heat softening temperature;
positioning a vacuum pickup within said heated cavity such that a sheet engaging surface of said pickup is in facing relation to an upper major surface of said sheet as said sheet is conveyed therethrough;
engaging said upper major surface of said sheet with said downwardly facing surface of said vacuum pickup;
drawing a vacuum through said downwardly facing surface of said pickup to hold said sheet thereagainst;
synchronizing movement of a pickup moving means with said sheet such that there is no relative horizontal movement between said pickup and said sheet during said engaging step;
transferring said sheet and said pickup to a shaping station;
releasing said sheet from said vacuum pickup to deposit said sheet between horizontally stationary, vertically aligned upper and lower shaping molds at said shaping station; and
pressing said sheet between said molds to shape said sheet.

12. The method as in claim 11 wherein said synchronizing means includes sensing the position of said sheet as said sheet is conveyed through said cavity and activating said pickup moving means in response to said sensing step, to move said pickup at the rate at which said sheet is conveyed through said heated cavity.

13. The method as in claim 12 wherein said drawing and engaging steps includes drawing a vacuum through said pickup to lift said sheet into engagement with said downwardly facing surface of said pickup within said cavity.

14. The method as in claim 13 further including the step of reciprocating said vacuum pickup from a lowered position wherein said downwardly facing surfaces in close proximity to said upper major surface of said sheet during said engaging and drawing steps, to a raised position after said engaging and drawing steps.

15. The method as in claim 14 wherein said upper mold is a vacuum mold and further including the steps of maintaining engagement of said shaped sheet with said upper vacuum mold after said pressing step, transferring said shaped sheet to a tempering ring, and moving said tempering ring into a cooling station wherein said shaped sheet is cooled.

16. The method as in claim 14 further including the step of deforming said downwardly facing surface of said vacuum pickup after said drawing step but prior to said releasing step so as to preliminarily shape said sheet.

17. The method as in claim 14 wherein said downwardly facing surface of said pickup is contoured to preliminarily shape said sheet prior to said shaping step.

18. The method as in claim 14 wherein said sheet is a glass sheet.

* * * * *

UNITED STATES PATENT AND TRADEMARK OFFICE
CERTIFICATE OF CORRECTION

PATENT NO. : 4,767,434

DATED : August 30, 1988

INVENTOR(S) : James H. Schwartz, Thomas L. Waterloo and George R. Claassen

It is certified that error appears in the above-identified patent and that said Letters Patent is hereby corrected as shown below:

Claim 1, line 5, delete "qtation" and insert --station--

Claim 13, line 4, after "pick up" insert --while--.

Signed and Sealed this

Thirty-first Day of July, 1990

Attest:

HARRY F. MANBECK, JR.

*Attesting Officer*     *Commissioner of Patents and Trademarks*